US009509768B2

(12) United States Patent  
Ormseth et al.

(10) Patent No.: US 9,509,768 B2  
(45) Date of Patent: Nov. 29, 2016

(54) ASSOCIATING USER INTERACTIONS ACROSS MULTIPLE APPLICATIONS ON A CLIENT DEVICE

(71) Applicant: Facebook, Inc., Menlo Park, CA (US)

(72) Inventors: Holly Marie Ormseth, San Francisco, CA (US); Daniel Kim, Foster City, CA (US); Matthew Michael Willis, Sunnyvale, CA (US); Jaed Uavechanichkul, San Jose, CA (US); Chen Chen, Sunnyvale, CA (US); Sean Elliott Dy, Mountain View, CA (US); Shayne Mikel Sweeney, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 178 days.

(21) Appl. No.: 14/470,871

(22) Filed: Aug. 27, 2014

(65) Prior Publication Data

US 2015/0326651 A1    Nov. 12, 2015

Related U.S. Application Data

(60) Provisional application No. 61/990,338, filed on May 8, 2014.

(51) Int. Cl.
```
G06F 15/16      (2006.01)
H04L 29/08      (2006.01)
H04L 12/58      (2006.01)
```
(52) U.S. Cl.  
CPC .............. *H04L 67/104* (2013.01); *H04L 51/04* (2013.01); *H04L 67/20* (2013.01); *H04L 67/22* (2013.01); *H04L 67/306* (2013.01); *H04L 67/32* (2013.01); *H04L 67/34* (2013.01)

(58) Field of Classification Search  
CPC ..... H04L 67/104; H04L 51/04; H04L 67/34; H04L 67/20; H04L 67/22; H04L 67/32; H04L 67/306  
See application file for complete search history.

(56) References Cited

U.S. PATENT DOCUMENTS

| | | | | |
|---|---|---|---|---|
| 5,949,990 A | * | 9/1999 | Mangelsdorf ....... | G06F 17/5022 703/14 |
| 8,271,778 B1 | * | 9/2012 | Zhou ................... | H04L 43/04 709/224 |

(Continued)

FOREIGN PATENT DOCUMENTS

KR    10-2013-0022023 A    3/2013

OTHER PUBLICATIONS

PCT International Search Report and Written Opinion, PCT Application No. PCT/US2014/053278, Jan. 20, 2015, eleven pages.

(Continued)

*Primary Examiner* — Krisna Lim  
(74) *Attorney, Agent, or Firm* — Fenwick & West LLP

(57) ABSTRACT

An online system transmits third-party content originating from a third-party system to a client device. The third-party content includes a pointer to a third-party application associated with the third-party system. When the client device receives an interaction with the third-party content from a user of the client device, the client device executes the third-party application and generates an attribution identifier from which the user's identity cannot be determined. The attribution identifier is transmitted to the online system. Subsequently, the client device determines information describing interactions by the user with the third-party application that is transmitted to the third-party system along with the attribution identifier. The third-party system transmits the attribution identifier and the information describing interaction with the third-party application to the online system, which matches the attribution identifiers to associate the interaction with the third-party content with the interactions with the third-party application.

20 Claims, 7 Drawing Sheets

(56) References Cited

U.S. PATENT DOCUMENTS

| | | | |
|---|---|---|---|
| 8,670,319 B2* | 3/2014 | Bennett | G06F 17/3089 370/232 |
| 8,850,567 B1* | 9/2014 | Hsieh | H04L 63/1483 726/22 |
| 8,868,740 B2* | 10/2014 | Pitchaikani | 709/219 |
| 9,130,936 B2* | 9/2015 | Tock | H04L 63/10 |
| 9,225,690 B1* | 12/2015 | Fitch | H04L 63/0428 |
| 9,280,613 B2* | 3/2016 | Smith | H04L 63/08 |
| 2002/0040395 A1 | 4/2002 | Davis et al. | |
| 2003/0163516 A1 | 8/2003 | Perkins et al. | |
| 2007/0067451 A1 | 3/2007 | Oshiba | |
| 2011/0040623 A1 | 2/2011 | Lauwers et al. | |
| 2011/0131635 A1* | 6/2011 | Schneider | H04L 63/1441 726/5 |
| 2011/0302306 A1 | 12/2011 | Hanson et al. | |
| 2012/0124206 A1 | 5/2012 | Butler et al. | |
| 2012/0166532 A1 | 6/2012 | Juan et al. | |
| 2012/0290549 A1 | 11/2012 | Ickman et al. | |
| 2012/0324027 A1 | 12/2012 | Vaynblat et al. | |
| 2013/0212274 A1* | 8/2013 | Tiu | G06F 17/3089 709/225 |
| 2013/0297680 A1* | 11/2013 | Smith | H04L 29/08117 709/203 |
| 2014/0068011 A1* | 3/2014 | Zhang | H04L 67/20 709/219 |
| 2014/0090066 A1 | 3/2014 | Li et al. | |
| 2014/0156360 A1 | 6/2014 | Shalita et al. | |
| 2014/0156566 A1 | 6/2014 | Kabiljo et al. | |
| 2014/0156744 A1 | 6/2014 | Hua et al. | |
| 2014/0250229 A1* | 9/2014 | Prokopenko | H04L 47/788 709/226 |
| 2015/0170529 A1* | 6/2015 | Hafeez | G09B 5/00 434/350 |
| 2015/0309971 A1* | 10/2015 | Cowley | G06F 9/44526 715/234 |

OTHER PUBLICATIONS

European Patent Office, Search Report and Opinion, European Patent Application No. 15165749.1, Jul. 21, 2015, eleven pages.

* cited by examiner

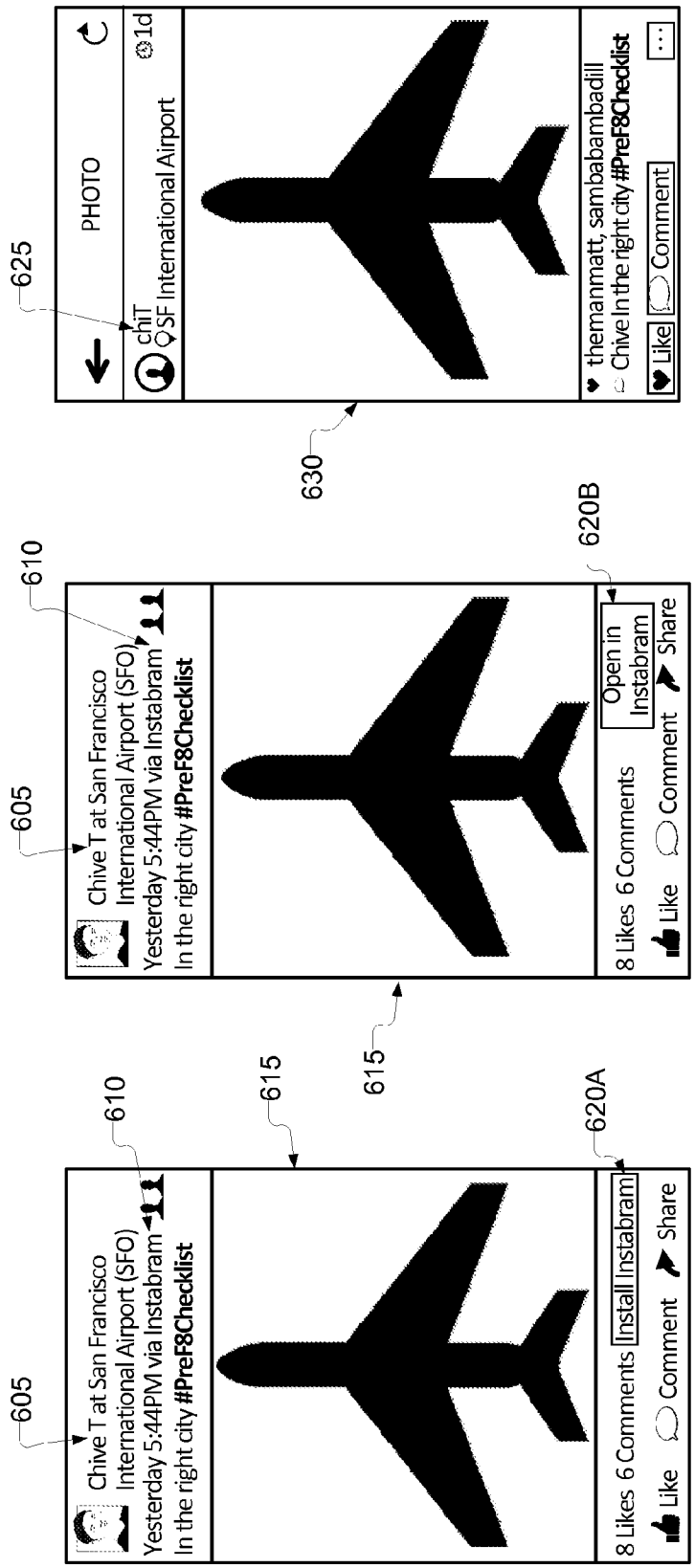

ASSOCIATING USER INTERACTIONS ACROSS MULTIPLE APPLICATIONS ON A CLIENT DEVICE

CROSS-REFERENCE TO RELATED APPLICATION

This application claims the benefit of U.S. Provisional Application No. 61/990,338, filed May 8, 2014, which is hereby incorporated by reference in its entirety.

BACKGROUND

A social networking system or an online system allows its users to connect to and communicate with other social networking system users. Users may create profiles on a social networking system that are tied to their identities and include information about the users, such as interests and demographic information. The users may be individuals or entities such as corporations or charities. Because of the increasing popularity of social networking systems and the increasing amount of user-specific information maintained by social networking systems, a social networking system provides an ideal forum for advertisers to increase awareness about products or services by presenting advertisements to social networking system users.

Users of a social networking system or other online system increasingly use mobile devices, such as smartphones or tablet computers, to access the social networking system or other online system. Typically, an application executing on the mobile device exchanges information with the social networking system or online system to provide the user with content. However, applications are conventionally associated with specific online systems, so a user frequently accesses multiple applications to retrieve content from various online systems or other sources. Because accessing multiple applications to access different content is time consuming, users may infrequently interact with certain applications, causing the user to overlook highly relevant or interesting content presented by infrequently accessed applications.

SUMMARY

An online system, such as a social networking system, facilitates communication (e.g., sharing content from sources external to the online system) among users of client devices, such as mobile devices. The online system may deliver content (e.g., social network content, images, video, audio, other media, advertisements) to users of the online system through an application that executes on a client device. The content may include a pointer specifying a third-party application executing on the client device, where the pointer identifies content for presentation by the third-party application. When a user interacts with content including such a pointer, the client device launches the third-party application, which presents the content identified by the pointer. If the third-party application specified by the pointer is not installed on the user's client device, the user may be prompted to install the third-party application specified by the pointer.

When the user interacts with content including the pointer specifying the third-party application via an application executing on the client device and associated with the online system, the application associated with the online system communicates information about the interaction to the online system, generates an attribution identifier associated with the interaction with the content including the pointer, and stores the attribution identifier in a storage of the client device that is capable of being accessed by multiple applications executing on the client device. The identity of the user interacting with the content including the pointer cannot be ascertained from the attribution identifier. The application associated with the online system communicates the attribution identifier and other information related to the interaction with the third-party application to the online system.

The third-party application specified by the identifier executes and displays the content identified by the pointer in the content from the online system with which the user interacted. Additionally, the third-party application generates an execution identifier corresponding to execution of the third-party application. This execution identifier may serve as a temporary user identifier for a user who has not created an account with a third-party system associated with the third-party application or who has not logged into their account with the third-party system associated with the third-party application. As the user interacts with the third-party application, the third-party application stores information describing user interactions with the third-party application (e.g., presentation of content to the user, a registration process to create an account on the third-party application), associates the user interactions with the third-party application with the generated execution identifier, and communicates these interactions to the third-party system associated with the third-party application. In some embodiments, the third-party system sends the attribution identifier and the information describing user interactions with the third party application associated with the execution identifier to the online system, which identifies the user based on the execution identifier and associates the interactions with the third-party application with information associated with the user by the online system.

BRIEF DESCRIPTION OF THE DRAWINGS

FIGS. 6A, 6B, and 6C illustrate additional example user interfaces of a client application and a third-party application, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1A:
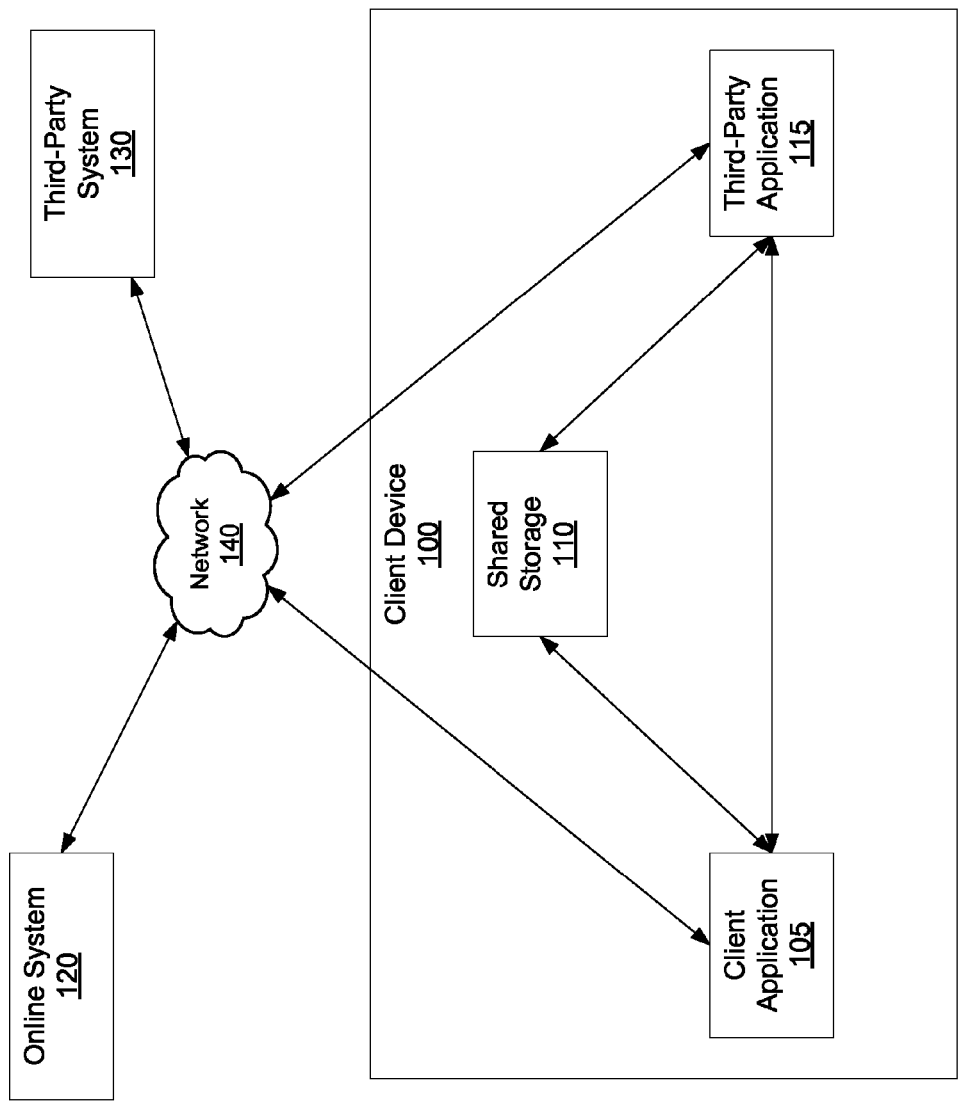
FIG. 1A is a block diagram of a system environment for an online system, in accordance with an embodiment.

FIG. 1A is a high level block diagram of a system environment for an online system 120. The system environment shown by FIG. 1A includes a client device 100, the online system 120, one or more third-party systems 130, and a network 140. The client device 100 includes a client application 105, a shared storage 110, and a third-party application 115. In alternative configurations, different and/or additional components may be included in the system environment. The embodiments described herein may be adapted to online systems that are not online systems 120.

The client device 100 is one or more computing devices capable of receiving user input, displaying content, and transmitting and/or receiving data via a network 140. In one embodiment, the client device 100 may be a device having computer functionality, such as a personal digital assistant (PDA), a mobile telephone, a smartphone, or another suitable device. Alternatively or additionally, the client device 100 is a conventional computer system, such as a desktop or a laptop computer. The client device 100 is configured to communicate via the network 140.

In one embodiment, the client device 100 executes the client application 105 allowing a user of the client device 100 to interact with the online system 120. For example, a client device 100 executes a browser application to enable interaction between the client device 100 and the online system 120 via the network 140. The client device 100 also executes a third-party application 115 allowing a user of the client device 100 to interact with the third-party system 130. The client device 100 may interact with the online system 120 or the third-party system 130 through an application programming interface (API) running on a native operating system of the client device 100, such as IOS® or ANDROID™.

Besides the client application 105 and the third-party application 115, the client device 100 includes a shared storage 110 accessible by multiple applications, such as the client application 105 and the third-party application 115, executing on the client device 100. In one embodiment, the shared storage 110 allows an application to temporarily or permanently store data for later access by the application or by one or more additional applications. For example, the client application 105 stores data (e.g., numerical data, a string of data) in the shared storage 110, and the third-party application 115 retrieves the stored data. The shared storage 110 may be implemented as a queue, a stack, an array, or any other suitable data structure, and may optionally include constraints on quantities of data stored or the duration for which data is stored in the shared storage 110.

The online system 120 facilitates communication, including sharing of content, among users. For example, the online system 120 is a social networking system. The online system 120 includes information describing users of the online system 120, such as characteristics provided to the online system 120 by users as part of a user profile. The online system 120 may deliver content such as media (e.g., images, video, audio, animations) or social network content (e.g., posts, stories, status updates, media, advertisements) to users of the online system 120 through the client application 105. By interacting with the client application 105, users may view or interact with content from the online system 120 or communicate content to the online system 120. In one embodiment, content provided by the online system 120 includes a pointer identifying the third-party application 115. A pointer includes a reference such as a Uniform Resource Locator (URL), a file address or location, a Uniform Resource Name (URN). The pointer may also identify a location of third-party content maintained by the third-party system 130 or a location from which the client device 100 may download the third-party application 115.

Figure 2:
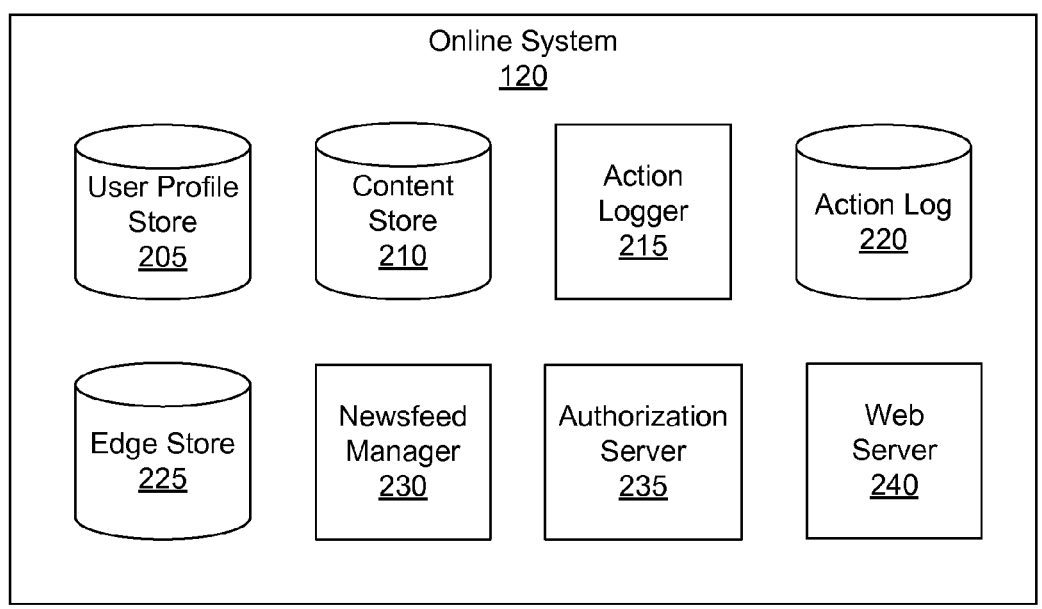
FIG. 2 is a block diagram of an online system, in accordance with an embodiment.

One or more third-party systems 130 may be coupled to the network 140 for communicating with mobile device 110 or with the online system 120, which is further described in conjunction with FIG. 2. In one embodiment, a third-party system 130 is an application provider communicating information describing the third-party application 115 or communicating data to the client device 100 for use by the third-party application 115. In other embodiments, a third-party system 130 provides third-party content or other information for presentation via the client device 100. A third-party website 130 may also communicate information to the online system 120, such as advertisements, third-party content, or information about the third-party application 115. The third-party application 115 provides an interface for a user to upload content to the third-party system 130 or to access or interact with content maintained by the third-party system 130. Example third-party applications 115 provide functionality for media sharing, media capture, media editing through user-friendly effects, messaging, social networking, organization, email, scheduling, event planning, playing or retrieving music, news distribution, accessing sports content, e-commerce, travel, navigation, and reviewing restaurants. Third-party content includes any content pertaining to the functionality of third-party system 130 and may include additional content such as advertisements received by the third-party system 130 (or advertisements for the third-party system 130 or third-party application 115).

The client devices 100 are configured to communicate via a network 140, which may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

Figure 1B:
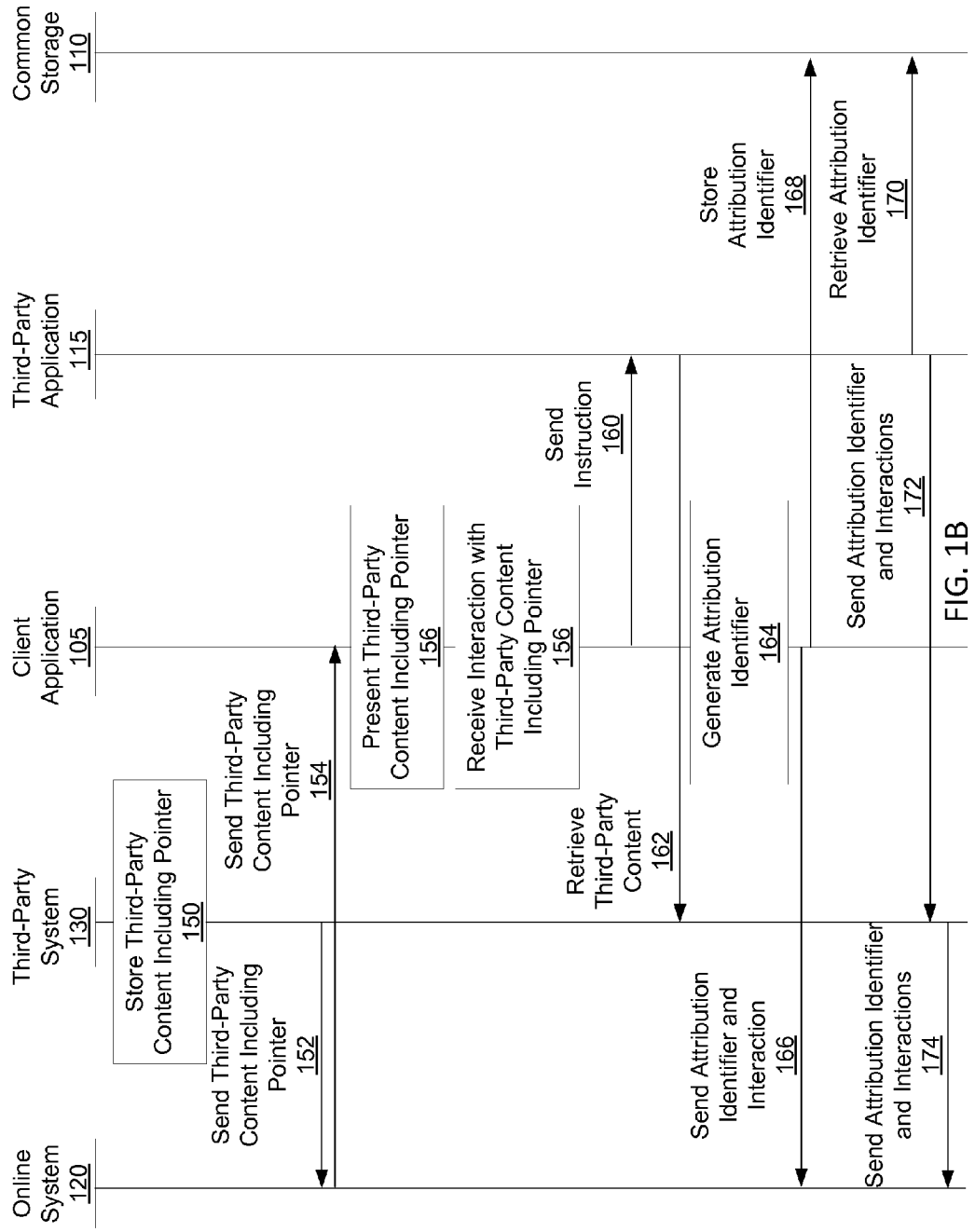
FIG. 1B is an interaction diagram illustrating interactions with third-party content by components of the system environment, in accordance with an embodiment.

FIG. 1B is an interaction diagram illustrating interaction with a third-party application 115 via a pointer included in content presented by the client application 105 associated with the online system 120 content via a third-party application 115, according to an embodiment. The third-party system 130 stores 150 third-party content, which may be received via the third-party application 115 executing on the client device 100, received from another third-party system 130, authored by a user affiliated with the third-party system 130, or obtained via any other suitable method. For example, the third-party content is an image captured by a user of the third-party system 130. The third-party content includes a pointer identifying the third-party application 115. For example, the pointer includes an application identifier associated with the third-party application 115 or other suitable information identifying the third party application 115. The pointer may also identify an address or other information for the third-party application 115 to retrieve the third-party content from the third party system 130 or from another source. The third-party system 130 sends 152 the third-party content including the pointer to the online system 120, which may store the third-party content.

The online system 120 sends 154 the third-party content including the pointer to the client application 105 executing on the client device 100 for presentation to a user of the online system 120. For example, the online system 120 selects the third-party content including the pointer for presentation to the user (and may send additional content for presentation along with the third-party content including the pointer), or the user of the client device 100 requests the third-party content including the pointer from the online system 120. The client application 105 presents 156 the third-party content including the pointer and receives 158 an interaction with the third-party content including the pointer. For example, the user requests to view the third-party content using the third-party application 115. As another example, the user requests to view additional third-party content associated with the same entity as the third-party content including the pointer.

In response to the received interaction with the third-party content including the pointer, the client application 105 identifies the third-party application 115 from the pointer and sends 160 an instruction to the third-party application 115 to launch the third-party application 115. In one embodiment, the third-party application 115 retrieves 162 the third-party content from the third-party system 130 for presentation to the user. In addition to communicating an instruction to the third-party application 115 to execute the third-party application 115, the client application 105 generates 164 an attribution identifier corresponding to the received interaction with the third-party content. The attribution identifier is generated through a process that is not reversible to obtain the identity of the user. For example, the attribution identifier is generated using a hash of an identifier associated with the client device 100. The client application 105 sends 166 the attribution identifier along with a record of the received interaction to the online system 120 and stores 168 the attribution identifier in the shared storage 110 of the client device 100.

After the third-party application 115 receives the instruction from the client application 105, the third-party application 115 retrieves 170 the attribution identifier from the shared storage 110. The third-party application 115 also logs information describing the user's interactions with the third-party application 115. For example, the third-party application 115 records additional content items that the user views through the third-party application 115. The third-party application 115 sends 172 the attribution identifier along with information describing interactions by the user with the third-party application 115 to the third-party system 130.

The third-party system 130 receives the attribution identifier and the information describing interactions with the third-party application 115, and sends 174 the attribution identifier and the information describing interactions with the third-party application 115 to the online system 120. The online system 120 determines whether the attribution identifier received from the third-party system 130 matches the attribution identifier received from the client application 105. If the attribution identifier received from the third-party system 130 matches the attribution identifier received from the client application 105, the online system 120 associates the interaction received along with the attribution identifier from the client application 105 with the information describing interactions with the third-party application 115 received from the third-party system 130 along with the attribution identifier received from the third-party system 130. Hence, the online system 120 uses attribution identifiers received from the client application 105 and received from the third-party system 130 to associate interactions received via the client application 105 with subsequent interaction received via the third-party application 115.

Online System

FIG. 2 is a block diagram of an architecture of the online system 120. The online system 120 shown in FIG. 2 includes a user profile store 205, a content store 210, an action logger 215, an action log 220, an edge store 225, a newsfeed manager 230, an authorization server 235, and a web server 240. In other embodiments, the online system 120 may include additional, fewer, or different components for various applications. Conventional components such as network interfaces, security functions, load balancers, failover servers, management and network operations consoles, and the like are not shown so as to not obscure the details of the system architecture.

Each user of the online system 120 is associated with a user profile, which is stored in the user profile store 205. A user profile includes declarative information about the user that was explicitly shared by the user and may also include profile information inferred by the online system 120. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 120, user profiles may also be stored for entities such as businesses or organizations. This allows an entity to establish a presence on the online system 120 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from mobile applications 105 or third-party applications 115 separate from the online system 120. Objects received from a third-party system 130 or from a third-party application 115 are referred to herein as "third-party content." In one embodiment, objects in the content store 210 represent single pieces of content, or content "items." Hence, online system users are encouraged to communicate with each other by posting text and content items of various types of media through various communication channels. This increases the amount of interaction of users with each other and increases the frequency with which users interact within the online system 120.

The action logger 215 receives communications about user actions internal to and/or external to the online system 120, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 120 to track user actions on the online system 120, as well as actions on third-party systems 130 that communicate information to the online system 120. Users may interact with various objects on the online system 120, and information describing these interactions is stored in the action log 220. Examples of interactions with objects include: commenting on posts, sharing links, and checking-in to physical locations via a mobile device, accessing content items, and any other suitable interactions. Additional examples of interactions with objects on the online system 120 that are included in the action log 220 include: commenting on a photo album, communicating with a user, establishing a connection with an object, joining an event, joining a group, creating an event, authorizing an application, using an application, expressing a preference for an object ("liking" the object) and engaging in a transaction. Additionally, the action log 220 may record a user's interactions with advertisements on the online system 120 as well as with other applications operating on the online system 120. In some embodiments, data from the action log 220 is used to infer interests or preferences of a user, augmenting the interests included in the user's user profile and allowing a more complete understanding of user preferences.

The action log 220 may also store user actions taken on a third-party system 130, such as an external website, and communicated to the online system 120. These actions may include interactions with a third-party application 115 executing on a client device 100 and associated with the third-party system 130. For example, an e-commerce website may recognize a user of an online system 120 through a social plug-in enabling the e-commerce website to identify the user of the online system 120. Because users of the online system 120 are uniquely identifiable, e-commerce websites, such as the preceding example, may communicate information about a user's actions outside of the online system 120 to the online system 120 for association with the user. Hence, the action log 220 may record information about actions users perform on a third-party system 130, including webpage viewing histories, advertisements that were engaged, purchases made, and other patterns from shopping and buying.

The action logger 215 may also associate interactions with a third-party application with a user profile maintained by the online system 120. While a third-party system 130 may be unable to identify a user profile maintained by the online system 120 that is associated with interactions received by the third-party application 115, the third-party system 130 may communicate data to the online system 120 that allows the online system 120 to infer the user profile maintained by the online system 120 maintained associated with the interactions received by the third-party application associated with the third-party system 130. In one embodiment, the online system 120 receives an attribution identifier from a client application 105 when a user performs an interaction with the client application 105 causing the client application 105 to communicate an instruction to the third-party application 115 that launches the third-party application 115. Along with the attribution identifier, the client application 105 reports the interaction causing creation of the attribution identifier. As described above in conjunction with FIG. 1B, the attribution identifier is generated through a process that is not reversible to determine the identity of the user from the attribution identifier alone. The third-party application 115 communicates the attribution identifier to the third-party system 130, which subsequently sends the attribution identifier and information describing interactions with the third-party application 115 associated with the third-party system 130 to the online system 120. For example, the information describing interactions with the third-party application 115 identify content viewed through the third-party application 115 and time spent accessing the third-party application 115. The action logger 215 associates information describing interactions with the third-party application 115 received from the third party system 130 along with an attribution identifier matching an attribution identifier received from the client application 105 and associates the information describing the interactions with the third-party application 115 with a user profile associated with a user corresponding to the attribution identifier received from the client application 105. In addition to matching attribution identifiers, the action logger 215 may perform additional actions to associate interactions with the third-party application 115 with a user profile in the online system 120 (e.g., account for times when an attribution identifier was received from the client application 105 and when an attribution identifier was received from a third party system 130 when comparing the attribution identifiers).

In one embodiment, the edge store 225 stores information describing connections between users and other objects on the online system 120 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 120, such as expressing interest in a page on the online system 120, sharing a link with other users of the online system 120, and commenting on posts made by other users of the online system 120.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 120, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 120 over time to approximate a user's interest in an object or another user in the online system 120 based on the actions performed by the user. A user's affinity may be computed by the online system 120 over time to approximate a user's interest for an object, a topic, or another user in the online system 120 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012 Now U.S. Pat. No. 9,070,141, Issued Jun. 30, 2015, U.S. patent application Ser. No. 13/689,969, filed on Nov. 30, 2012, Now U.S. Pat. No. 9,317,812, Issued Apr. 19, 2016 and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the online system 120 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in the edge store 225 or may select candidate stories included in content store 210. A story may incorporate third-party content received from a third-party system 130. In some embodiments, a story incorporating third-party content may include an explicit indication that content included in the story originated in the third-party system 130 or that that content in the story is associated with a third-party application 115. A story including content associated with a third-party application 115 or including content received from a third-party system 130 may also include a pointer to the third-party application 115, allowing a user of the online system 120 to view the content associated with the third-party application 115 or received from the third-party system 130 via the third-party application 115. One or more of the candidate stories are selected and presented to a user by the newsfeed manager 230.

For example, the newsfeed manager 230 receives a request to present one or more stories to an online system user. The newsfeed manager 230 accesses one or more of the user profile store 205, the content store 210, the action log 220, and the edge store 225 to retrieve information about the identified user. For example, stories or other data associated with users connected to the identified user are retrieved. The retrieved stories or other data are analyzed by the newsfeed manager 230 to identify content likely to be relevant to the identified user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 presents stories to a user through a newsfeed including a plurality of stories selected for presentation to the user. The newsfeed may include a limited number of stories or may include a complete set of candidate stories. The number of stories included in a newsfeed may be determined in part by a user preference included in the user profile store 205. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, the newsfeed manager 230 may analyze stories received by online system 120 from various users to obtain information about user preferences or actions from the analyzed stories. This information may be used to refine subsequent selection of stories for newsfeeds presented to various users.

The authorization server 235 enforces one or more privacy settings of the users of the online system 120. A privacy setting of a user determines how particular information associated with a user can be shared, and may be stored in the user profile of a user in the user profile store 205 or stored in the authorization server 235 and associated with a user profile. In one embodiment, a privacy setting specifies particular information associated with a user and identifies the entity or entities with whom the specified information may be shared. Examples of entities with which information can be shared may include other users, applications, third-party systems 130 or any entity that can potentially access the information. Examples of information that can be shared by a user include user profile information like profile photo, phone numbers associated with the user, user's connections, actions taken by the user such as adding a connection, changing user profile information and the like.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third-party systems 130, specific third-party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The authorization server 235 includes logic to determine if certain information associated with a user can be accessed by a user's friends, third-party system 130 and/or other applications and entities. For example, a third-party system 130 that attempts to access a user's comment about a uniform resource locator (URL) associated with the third-party system 130 must get authorization from the authorization server 235 to access information associated with the user. Based on the user's privacy settings, the authorization server 235 determines if another user, a third-party system 130, an application or another entity is allowed to access information associated with the user, including information about actions taken by the user. For example, the authorization server 235 uses a user's privacy setting to determine if the user's comment about a URL associated with the third-party system 130 can be presented to the third-party system 130 or can be presented to another user. This enables a user's privacy setting to specify which other users, or other entities, are allowed to receive data about the user's actions or other data associated with the user.

In some embodiments, the authorization server 235 may include user permissions regulating association of a user profile associated with a user and maintained by the online system 120 with interactions with a third-party application 115. These user permissions may be used to determine whether to associate information describing user interactions with a third-party application with a user profile associated with a user of the online system 140. Additionally, these user permissions allow a user to specify an extent to which information in a user profile associated with a user may be used to personalize one or more interfaces of a third-party application 115 associated with one or more interactions that are associated with the user's user profile maintained by the online system 120.

The web server 240 links the online system 120 via the network 140 to the one or more client devices 100, as well as to the one or more third-party systems 130. The web server 120 serves web pages, as well as other web-related content, such as JAVA®, FLASH®, XML and so forth. The web server 240 may receive and route messages between the online system 120 and the client device 100, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native mobile device operating systems, such as IOS®, ANDROID™, WEBOS® or BlackberryOS.

Associating User Interactions Across Applications

Figure 3:
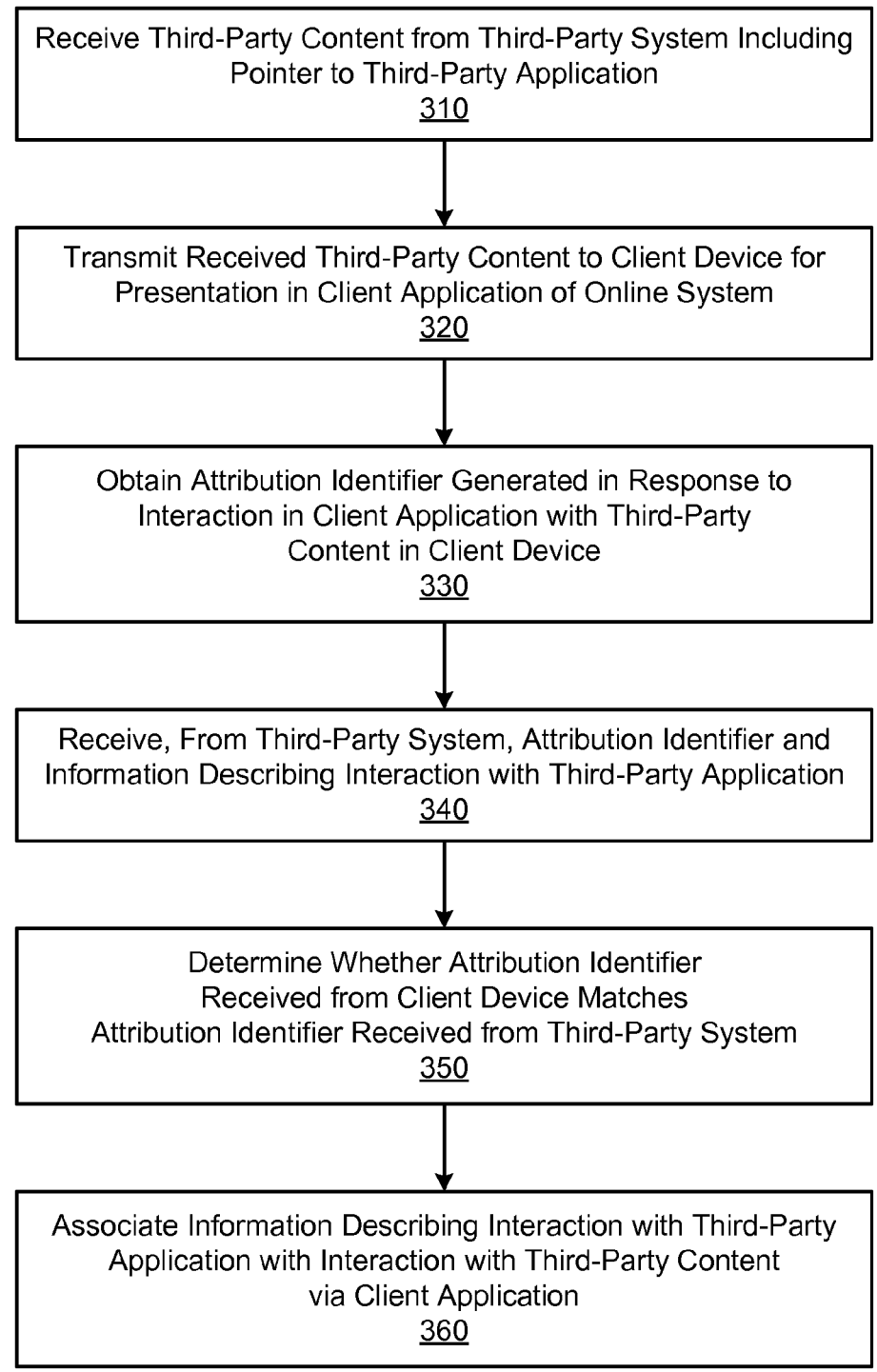
FIG. 3 is a flowchart of a process for associating user interactions across applications executing on a client device, in accordance with an embodiment.

FIG. 3 is a flowchart of one embodiment of a process for associating user interactions across applications executing on a client device 100. The steps of the process described in conjunction with FIG. 3 may be performed in different orders than the order described in conjunction with FIG. 3. For example, steps that are described as simultaneous may be performed in sequence or partially in parallel. In some embodiments, different and/or additional steps than those described in conjunction with FIG. 3 may be performed.

An online system 120 receives 310 third-party content originating from a third-party system 130 that includes a pointer to a third-party application 115 associated with the third-party system 130. A user associated with the third-party system 130 creates the third-party content, or the third-party system 130 may generate the third-party content. For example, the third-party content includes an image and a pointer to the third-party application 115, allowing the image to be viewed using the third-party application 115. The third-party content may also include a unique identifier of the third-party content in the third-party system 130 or other suitable information for retrieving the third-party content from the third-party system 130. The online system 120 may assign its own unique identifier to the third-party content or use the identifier of the third-party content in the third-party system 130.

The online system 120 transmits 320 the third-party content to a client device 100 for presentation in a client application 105 associated with the online system 120. In one embodiment, the online system 120 incorporates the third-party content into a story generated by the online system 120 including the third-party content and the pointer to the third-party application 115. For example, the online system 120 selects the story for inclusion in a newsfeed for a user based on affinity between the user and the story containing the third-party content. For example, the user has a high affinity for the story if the user has a high affinity for a user identified by the story or if the user has given positive feedback to the online system 120 for previously-presented stories including content similar to the third-party content. In some embodiments, the online system 120 modifies the user's affinity for a story including the third-party content if the third-party system 130 compensates the online system 120 for presenting the story or if the third-party content was received 310 within a threshold time interval from a current time by the online system 120. Alternatively or additionally to using affinity, the online system 120 uses one or more deterministic rules specified by a user's preferences to filter stories for presentation to the user based on characteristics of stories. Example characteristics of stories used for filtering include a user identified by a story, a user generating a story, a type of third-party content included in a story, a source of content included in a story (e.g., the third-party system 130), a source application (e.g., the third-party application 115) of the third-party content included in a story, or a location associated with the third-party content. Alternatively or additionally to the online system 120 selecting the third-party content for presentation to a user of the client device 100, the user may request to view the third-party content. For example, the user of the client device 100 requests to view content associated with a specified user associated with the third-party content.

The client application 105 executing on the client device 100 presents the third-party content that the client device 100 receives from the online system 120. If the user of the client device 100 interacts with the third-party content presented by the client application 105, the online system 120 obtains 330 an attribution identifier and a record of an interaction with the third-party content via the client application 105. The record of the interaction describes the interaction with the third-party content. An example record of the interaction includes the third-party content (or an identifier of the third-party content), an identifier of the client device 100, an identifier of a user profile associated with the client application 105, a time of the interaction, or other suitable information. In various embodiments, the record of the interaction includes one or more of an identifier of the client device 100, an identifier of the client application 105, an identifier of an operating system of the client device 100, or an identifier of another software or hardware component of the client device 100. The record of the interaction data may also indicate a state of the client device 100, such as an indication of whether the third-party application 115 identified by the pointer included in the third-party content is installed on the client device 100.

The online system 120 receives 330 the attribution identifier from the client application 105 in response to the interaction, which causes the client device 100 to launch the third-party application 115 identified by the pointer included in the third-party content. In one embodiment, the client device 100 generates the attribution identifier through a hash function that maps an input to an output. The hash function uses data describing the interaction as an input and deterministically generates an attribution identifier from the input so that the original input may not be determined in a deterministic or computationally feasible manner. To ensure that the identity of the user performing the interaction cannot be determined from the attribution identifier, the client device 100 may use a cryptographic hash function in some embodiments. Alternatively or additionally to using a hash function, the client device 100 may randomly generate the attribution identifier. The attribution identifier may include additional data to associate the attribution identifier with the client application 105. For example, the attribution identifier includes a standard prefix or postfix. Alternatively to receiving the attribution identifier, the online system 120 receives interaction data describing the interaction with the third-party content from the client device 100, generates an attribution identifier through a hash of the interaction data, and transmits the generated attribution identifier to the client device 100.

Subsequently, the online system 120 receives 340 an attribution identifier from the third-party system 130 as well as information describing interactions with the third-party application 115 associated with the third-party system 130. The third-party system 130 receives the attribution identifier and the information describing interactions from the third-party application 115. In one embodiment, the information describing interactions with the third-party system 130 are associated with an execution identifier generated by the third-party application 115. The execution identifier identifies interactions corresponding to execution or launch of the third-party application 115 from the client application 105. For users that do not register or log-in with the third-party system 130, the execution identifier may act as a temporary user identifier. The online system 120 may receive 340 the attribution identifier from the third-party system 130 in real-time (e.g., before the third-party content is retrieved by the third-party application 115, as actions are logged in the third-party application 115) or as a batch process (e.g., periodically or in response to receiving information describing interactions and associated identifiers).

The information describing interactions with the third-party application 115 may specify attributes of interactions with the third-party content (e.g., duration of an interaction, a description of actions performed in response to an interaction). Example interactions with the third-party application include navigation commands to view different portions of text or images, navigation commands though audio or video data, or social interactions such as comments or actions indicating approval or disapproval. Interactions described by the information may also include interactions with other third-party content. In one embodiment, the third-party application 115 presents the user with a registration interface prior to presenting the third-party content, or the third-party content is the registration interface. In this case, the described interactions described include interactions with the registration process, and the description of the interactions indicates progress through fields of the registration interface (e.g., time spent on different fields or views of the registration interface, successful submissions, irregular or incorrect submissions, interactions with preview content accessible without registering). The information describing interactions with the third-party application 115 may include metrics associated with interactions with the third-party application 115. An example metric is time spent accessing the third-party application 115 or a number of interactions with third-party content. Another example metric is revenue associated with advertisements with which the user interacts. In one embodiment, the attribution identifier obtained 330 from the client device 100 and/or the attribution identifier received 340 from the third-party system 130 do not include a user identifier used by the online system 120 or used by the third-party system 130 to protect user privacy.

The online system 120 determines 350 whether the attribution identifier obtained 330 from the client device 100 matches the attribution identifier 340 received from the third-party system 130. The online system 120 applies attribution rules to the attribution identifier obtained 330 from the client device 100 and the attribution identifier received 340 from the third-party system 130 as well as the information describing interactions with the third-party application 115 as part of an attribution model. In one embodiment, the online system 120 matches the attribution identifier received 340 from the third-party system 130 with the attribution identifier obtained 330 from the client device 100. If the attribution identifier received 340 from the third-party system 130 matches the attribution identifier obtained 330 from the client device 100, the online system 120 associates interactions with the third-party application 115 received from the third-party system 130 with a user profile associated with the attribution identifier obtained 330 from the client device 100.

The attribution model infers that user interactions with the third-party application 115 that are associated with the attribution identifier received 340 from the third-party system 130 correspond to the interaction with the content including the pointer to the third-party content via the client application 105. If the user interacts with content including pointers to third-party content multiple times via the client application 105, then the online system 120 receives information describing various interactions with the third-party application 115 each associated with a different attribution identifier corresponding to an execution of the third-party application 115. The attribution model provides rules for matching an execution of the third-party application 115 by interacting with content including a pointer to the third-party application 115 via the client application 105 to corresponding information describing interaction with the third party application 115. One example rule matches information describing interaction with a third-party application 115 with an attribution identifier obtained 330 from the client device 100 in response to an interaction with the third-party content including the pointer received within a threshold time interval from receipt 340 from the third-party system 130 of the attribution identifier and information describing interaction with the third-party application 115. Other example attribution rules associate information describing interaction with a third-party application 115 with each attribution identifier obtained 330 from the client device 100 from interaction with different third-party content within a threshold period of time before receipt 340 of the information describing interaction with the third-party application 115.

The online system 120 associates 360 the information describing interaction with the third-party application 115 with the interaction with the client application 105 in response to determining that the attribution identifier obtained 330 from the client device 100 matches the attribution identifier received 340 from the third-party application 115. The online system 120 may further associate the information describing interaction with the third-party application 115 with a user profile of the user maintained by the online system 120. In one embodiment, matching information describing interaction with the third-party application 115 to interaction with the client application 105 provides better metrics for evaluating effectiveness of advertisements included in content. For example, advertisers pay an amount to the online system 120 for an advertisement impression by a user, a higher amount for an interaction with an advertisement that causes execution of the third-party application 115, and a still higher amount for an interaction with an advertisement that causes valuable actions in the third-party application 115 (e.g., engaging in a commercial transaction, registering for a user account with the third-party system 130, or otherwise interacting with third-party content). Associating user interactions with the client application 105 and with the third-party application 115 also increases understanding of how pointers to third-party content affect usage of the online system 120. For example, this association data may indicate whether revenue gains from offering advertisements with links to a third-party application 115 are offset by revenue losses from less time spent interacting with the online system 120.

In one embodiment, associating interactions with a third-party application 115 with one or more interactions with the client application 105 may enhance user experience with the third-party application 115. For example, if the user does not have a user account with the third-party system 130, the third-party application 115 presents the user with a preconfigured profile created by the third-party application 115 based on the user profile maintained by the online system 120 for the user. As another example, the third-party application 115 personalizes a registration interface using content likely to appeal to a user based on information associated with the user by the online system 120 (e.g., content based on the user's interests, publicly available content associated with user profiles of users that are connected to the user in the online system 120). In another example, third-party content is personalized for the user based on its user profile maintained by the online system 120 even if the user is not logged into an account maintained by the third-party system 130 for the user. Hence, associating the user's interaction with the third-party application 115 with the user profile in the online system 120 allows personalization of advertisements or recommendations presented to a user via the third-party system 130 even if the third-party system 130 does not maintain an account for the user.

Figure 4:
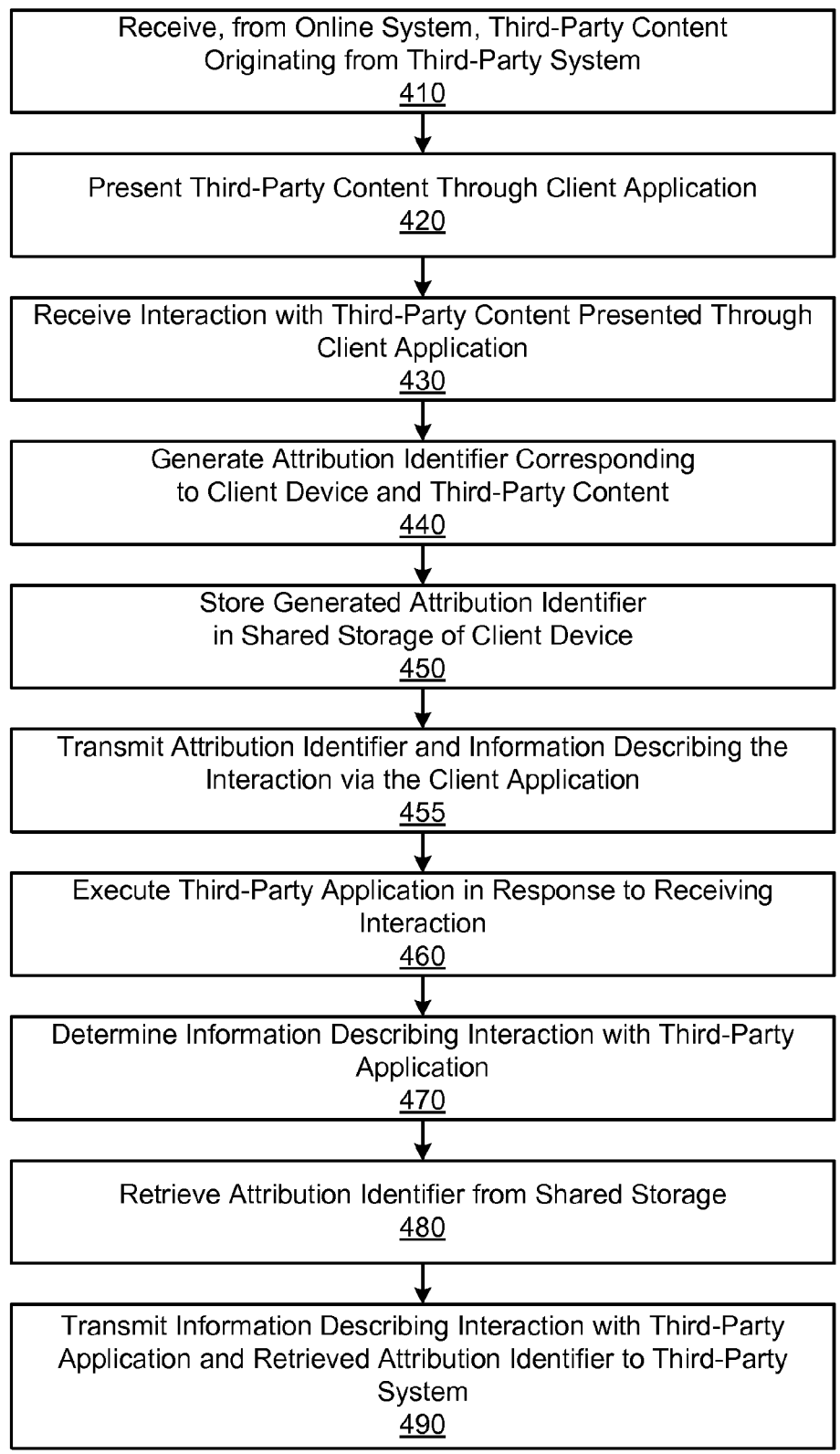
FIG. 4 is a flowchart of a process a process for reporting user interactions across applications executing on a client device, in accordance with an embodiment.

FIG. 4 is a flowchart illustrating a process for reporting user interactions across applications executing on a client device 100, in accordance with an embodiment. The client device 100 receives 410 third-party content from the online system 120. The third-party content originates from a third-party system 130. For example, the online system 120 pushes the third-party content to the client device 100. As another example, the client device 100 requests content associated with the third-party system 130 or associated with various users of the online system 120.

The client device 100 presents 420 the third-party content through the client application 105. For example, the client application 105 retrieves media from the online system 120 or from the third-party system 130 using a pointer in the third-party content. For example, the third-party content is a low-resolution or a partially obscured image with accompanying text explaining that the full, high-quality image may be viewed in the third-party application 115. The third-party content may also include a graphical or textual indication that the third-party content originated in the third-party system 130. In one embodiment, the client device 100 determines whether the third-party application 115 is installed on the client device 100 and displays an indication of whether selection of the indication would open the third-party application 115 or would initiate a download of the third-party application 115.

The client device 100 receives 430 an interaction with the third-party content presented through a client application 105 executing on the client device 100. Examples of an interaction with the third-party content include selection of the third-party content to expand a preview of the third-party content within the client application 105 or selection of a graphical representation of the pointer to the third-party content. An interaction may be an interaction with a graphical indication that the third-party content originated in the third-party system 130 or an interaction with information identifying a user of the third-party system 130 authoring the third-party content. Additional examples of interaction with the third-party content include presenting the third-party content to the user of client device 100 (i.e., an impression of the content) or selecting a pointer to install the third-party application 115 if it is not installed on the client device 100.

The client device 100 obtains 440 an attribution identifier corresponding to the client application 105 and the third-party content. In one embodiment, the client application 105 captures data (e.g., an identifier of the third-party content, an identifier describing the interaction with the third-party content, an identifier associated with the user by the online system 120) describing the received interaction and generates the attribution identifier (e.g., with a hash function). The client device 100 stores 450 the generated attribution identifier in the shared storage 110. In an alternative embodiment, the client application 105 transmits the data describing the interaction with the third-party content to the online system 120, which generates an attribution identifier. The client device 100 receives the generated attribution identifier from the online system 120 and stores 450 the generated attribution identifier in the shared storage 110.

The client device 100 transmits 455 the attribution identifier and a description of the received interaction with the third-party content via the client application 105 to the online system 120. The client application 105 may transmit 455 the description of the interaction and one or more identifiers associated with the interaction (e.g., a client device identifier, an identifier of the user performing the interaction, etc.) substantially in real-time after receiving 430 the interaction. Alternatively, the client device 100 transmits 455 the attribution identifier and the description of the received interaction periodically or in response to a condition (closing, terminating, or minimizing the third-party application 115 or the client application 105). In an alternative embodiment where the online system 120 generates the attribution identifier, the attribution identifier is not sent to the online system 120, which stores the attribution identifier after generation.

The client device 100 executes 460 the third-party application 115 in response to receiving the interaction with the third-party content through the client application 105. In one embodiment, when the third-party application 115 is executed 460, the third-party application 115 operates in a particular state based on information in the pointer included in the third-party content. For example, the third-party application 115 is executed 460 to present a state displaying the third-party content or a state displaying content related to a user associated with the third-party content. For example, based on information in the pointer, the third-party application 115 retrieves the third-party content from the third-party system 130 and presents the third-party content when it is executed 460. Executing the third-party application 115 may include prompting the user to register with or log-in to the third-party system 130 by providing user data in one or more fields presented by the third-party application 115.

Executing the third-party application 115 may comprise installing the third-party application 115 on the client device 100. For example, the client device 100 determines whether the third-party application 115 is installed on the client device 100 (or whether at least a threshold version of the third-party application 115 is installed to warrant updating the third-party application to a more recent version). In response to determining that the third-party application 115 is not installed on the client device 100, the client device 100 prompts the user to download the third-party application 115 after receiving 430 the interaction with the third-party content presented by the client application 105. To install the third-party application 115, the client device 100 retrieves the third-party application 115 from the third-party system 130 or from a different entity (e.g., a server hosting available applications for purchase or free download) and installs the third-party application 115. After installation, the client device 100 presents the third-party content in the third-party application 115 (or the user is prompted to register or log-in to the third-party system 130).

Based on the pointer to the third-party content, the third-party application 115 retrieves the third-party content from the third-party system 130 (or from any other suitable source) and presents the third-party content. The third-party content may include elements that were presented in the third-party content presented by the client application 105. For example, the third-party content is a higher quality version of an image presented as third-party content by the client application 105. In one embodiment, the third-party content may be a registration interface for creating an account with the third-party system 130 or for otherwise initializing user interaction with the third-party system 130.

The client device 100 determines 470 information describing interaction with the third-party application 115 by the user of the client device 100. For example, the third-party application 115 captures data identifying a user interaction with the third-party content, identifying a user interaction with additional third-party content, or identifying user interaction with an advertisement. Example interactions with content via the third-party application 115 include impressions of content or an amount of time the client device 100 spends presenting content via third party application 115 (e.g., visually or aurally). If the third-party application 115 presents the user with a registration (or log-in) process, the third-party application 115 determines 470 information describing interactions with the registration, such as data entered and cumulative progress through the registration process. The client device 100 may alternatively or additionally determine metrics (e.g., number of interactions, time of interactions, associated revenue) corresponding to interactions with the third-party application 115.

In one embodiment, the third-party application 115 retrieves 480 the attribution identifier from the shared storage 110 and generates an execution identifier, which identifies the execution of the third-party application 115 and is associated with interactions with the third-party application 115 after execution of the third-party application 115. For example, a user closes the third-party application 115, re-executes the client application 105, and again selects the pointer to the third-party application 115. In this example, the third-party application 115 executes again, retrieves another attribution identifier form the shared storage 110, and generates another execution identifier to associate with subsequent interactions of the user with the third-party application 115. The execution identifier may be generated using various deterministic or random techniques. For example, the execution identifier is generated by applying a hash function to input describing interaction with the client application 105. In one embodiment, the third-party application 115 applies a hash function to the attribution identifier retrieved from the shared storage 110 or to other available information (e.g., a device identifier, an identifier of the user in the third-party system 130). Interactions with the third-party application 115 are associated with the generated execution identifier.

The client device 100 transmits 490 the information describing interaction with the third-party application 115 to the third-party system 130 in association with the attribution identifier. The client device 100 may transmit 490 additional information to the third-party system 130, such as the generated execution identifier, the device identifier, a third-party content identifier, a third-party user identifier, or other information associated with execution of the third-party application 115. The information describing interaction with the third-party application 115 and the attribution identifier may be transmitted 490 in real-time as the user interacts with the third-party application 115, may be transmitted 490 at periodic intervals, or may be transmitted 490 in response to one or more interactions (e.g., closing, terminating, or minimizing the third-party application 115).

Example User Interface

Figures 5A, 5B, 5C:
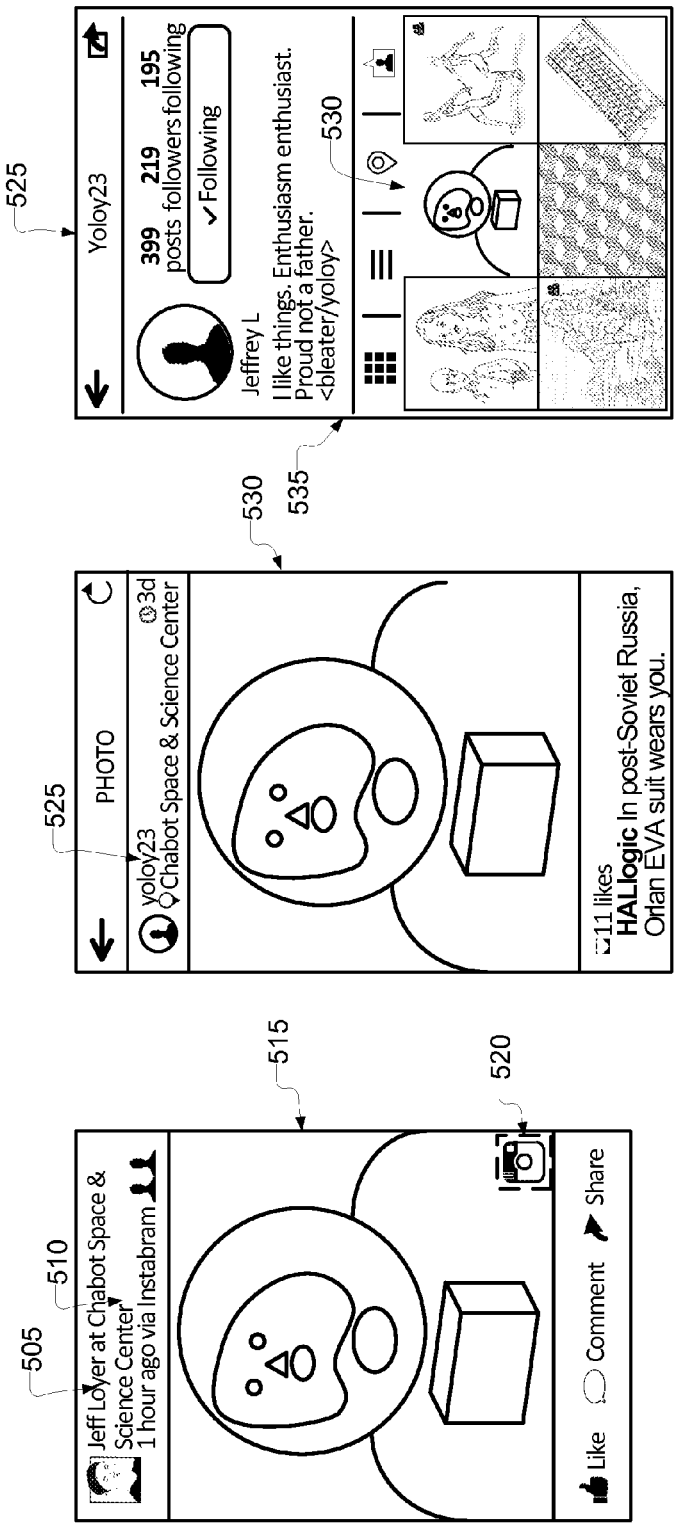
FIGS. 5A, 5B, and 5C illustrate example user interfaces of a client application and a third-party application, in accordance with an embodiment.

FIGS. 5A, 5B, and 5C illustrate example user interfaces of a client application 105 and a third-party application 115. FIG. 5A illustrates third-party content including a pointer to third-party content presented in an interface of the client application 105. The third-party content includes a user name 505, a third-party application name 510, a preview 515 of the third-party content, and an icon 520 representing a pointer to the third-party application 115. The user name 505 indicates a user name associated with the user by the online system 120 and is associated with a user profile maintained by the online system 120 for the user. The third-party application name 510 indicates that the third-party content was generated by the third-party system 130 and that the content includes a pointer to the third-party application 115. The preview 515 of the third-party content in the example of FIG. 5A is an image. The icon 520 represents the third-party application 115 and may be selected by the user (an interaction) to view the third-party content in the third-party application 115.

FIGS. 5B and 5C illustrate the third-party content in an interface of the third-party application 115. The third-party content includes a third-party application user name 525 and the third-party content 530. The third-party user name 525 is a user name associated with the user by the third-party system 130 and may differ from the user's third-party user identifier. In the example of FIG. 5B, the third-party content 530 is an image. In this example, the image in the preview 515 does not substantially differ from the third-party content 530, but the preview 515 may also be a smaller, obscured, or otherwise modified view of the third-party content 530, for example.

In one embodiment, the third-party application 115 uses different user interfaces to present the third-party content 530 depending on whether the user selects third-party content that is publicly available or private third-party content that another user has elected to make available to the user. In this embodiment, FIG. 5B corresponds to publicly available third-party content, and FIG. 5C corresponds to privately available third-party content accessible by the user interacting with the client application 105. In FIG. 5C, a thumbnail image of the third-party content 530 is displayed as part of a user profile page 535 of the user that posted the third-party content 530. This user profile page 535 includes descriptive information about the user that posted the third-party content 530 and other third-party content uploaded by the user that posed the third-party content 530.

FIGS. 6A, 6B, and 6C illustrate additional example user interfaces of a client application 105 and a third-party application 115. FIGS. 6A and 6B illustrate third-party content including a pointer to a third-party application 115, presented in an interface of the client application 105. The third-party content includes a user name 605, a third-party application name 610, a preview 615 of third-party content, and an icon 620 representing a pointer to the third-party application 115. The user name 605 is a user name associated with the user by the online system 120 and is associated with a user profile associated with the user by the online system 120. The third-party application name 610 indicates that the content was generated through the third-party system 130 and that the content includes a pointer to the third-party application 115. The preview 615 of the third-party content in the example of FIG. 6A is an image. The icon 620 represents the third-party application 115 and may be selected by the user (an interaction) to view the third-party content in the third-party application 115. In the illustrated interface, the icon 620 presents a determination of whether the third-party application 115 associated with the third-party content is installed on the client device 100. FIG. 6A shows the icon 620A presented if the third-party application 115 is not installed on the client device 100. The icon 620A indicates that selection of the icon 620A initiates installation of the third-party application 115. FIG. 6B shows icon 620B, which is presented if the third-party application 115 is installed on the client device and indicates that selection of icon 620B executes the third-party application 115 to display the third-party content.

FIG. 6C illustrates the third-party content in an interface of the third-party application 115. The third-party content includes a third-party application user name 625 and the third-party content 630. The third-party user name 625 indicates a user name associated with the user by the third-party system 130 and may differ from the user's third-party user identifier. The example third-party content 630 is an image. In this example, the image in the preview 615 does not substantially differ from the third-party content 630, but they preview 615 may also be a smaller, obscured, or otherwise modified view of the third-party content 630, for example.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    transmitting, from an online system to a client device, third-party content originating from a third-party system, the third-party content for presentation in a client application associated with the online system and including a pointer to a third-party application associated with the third-party system;
    obtaining an attribution identifier and an interaction with the third-party content by a user of the client device via the client application, the attribution identifier generated in response to the interaction, and the interaction causing the client device to execute the third-party application using the pointer;

receiving, from the third-party system, an attribution identifier and information describing interaction by the user with the third-party application;

determining, by a processor, whether the attribution identifier obtained from the client device matches the attribution identifier received from the third-party system; and associating the information describing interaction by the user with the third-party application with the interaction with the third-party content by the user of the client device via the client application responsive to determining that the attribution identifier obtained from the client devices matches the attribution identifier received from the third-party system.

2. The method of claim 1, further comprising:
associating the information describing interaction by the user with the third-party application with a user profile of the user of the client device maintained by the online system responsive to determining that the attribution identifier obtained from the client devices matches the attribution identifier received from the third-party system.

3. The method of claim 1, wherein transmitting, from the online system to the client device, the third-party content originating from the third-party system comprises:
generating a story including the third-party content and the pointer to the third-party application; and
selecting the story for inclusion in a newsfeed for presentation to the user based at least in part on an affinity between the user and the third-party content.

4. The method of claim 1, wherein receiving, from the third-party system, the attribution identifier and the information describing interaction by the user with the third-party application comprises:
receiving information describing an interaction selected from a group consisting of: an interaction with the third-party content via the third-party application, an interaction with additional third-party content via the third-party application, an interaction of the user with a registration process of the third-party application, and any combination thereof.

5. The method of claim 1, wherein receiving, from the third-party system, the attribution identifier and the information describing interaction by the user with the third-party application comprises:
receiving a metric associated with one or more interactions by the user with the third-party application, the metric selected from a group consisting of: time spent by the user interacting with the third-party application, revenue associated with advertisements in the third-party application, a number of interactions by the user with additional third-party content in the third-party application, and any combination thereof.

6. The method of claim 1, wherein receiving, from the third-party system, the attribution identifier and the information describing interaction by the user with the third-party application comprises:
receiving an execution identifier generated by the third-party application, the execution identifier generated in response to the interaction with the third-party content causing the client device to execute the third-party application; and
receiving the information describing interaction by the user with the third-party application associated with the received execution identifier.

7. The method of claim 1, wherein the attribution identifier received from the third-party system is generated by a cryptographic hash of data comprising at least one selected from a group consisting of: an identifier of the client device, an identifier of the user maintained by the online system, an identifier of an operating system of the client device, an identifier of the third-party content in the online system, an indication of whether the third-party application is installed on the client device, and any combination thereof.

8. The method of claim 1, wherein obtaining the attribution identifier and the interaction with the third-party content by the user of the client device via the client application comprises:
receiving data comprising at least one selected from a group consisting of: an identifier of the client device, an identifier of the user by the online system, an identifier of an operating system of the client device, an identifier of the third-party content in the online system, and an indication of whether the third-party application is installed on the client device;
generating an identifier through a cryptographic hash of the received data; and
transmitting the identifier from the online system to the client device.

9. A method comprising:
receiving, at a client device, a third-party content item from an online system, the third-party content item originating from a third-party system and including a pointer to a third-party application associated with the third-party system;
receiving, at the client device, an interaction by a user with the third-party content item presented through a client application executing on the client device;
obtaining an attribution identifier corresponding to the client device and the third-party content item, the attribution identifier generated in response to the interaction;
transmitting, from the mobile device to the online system, the attribution identifier and information describing the interaction;
storing the attribution identifier in a storage location of the client device accessible by the third-party application;
executing, at the client device, the third-party application to present the third-party content item in response to receiving the interaction;
determining information describing interactions by the user with the third-party application; and
transmitting, from the mobile device to the third-party system, the information describing interactions by the user with the third-party application in association with the attribution identifier retrieved from the storage location by the third-party application.

10. The method of claim 9, wherein executing the third-party application to present the third-party content item comprises:
determining whether the third-party application is installed on the client device; and
prompting the user of the client device to download the third-party application responsive to determining that the third-party application is not installed on the client device.

11. The method of claim 9, wherein determining the information describing interactions by the user with the third-party application comprises:
storing information describing an interaction selected from a group consisting of: an interaction with the third-party content item via the third-party application, an interaction with additional third-party content item via the third-party application, an interaction of the user with a registration process of the third-party application, and any combination thereof.

12. The method of claim 9, wherein determining the information describing interactions by the user with the third-party application comprises:
determining a metric associated with one or more interactions by the user with the third-party application, the metric selected from a group consisting of: time spent by the user interacting with the third-party application, revenue associated with advertisements in the third-party application, a number of interactions by the user with an additional third-party content item in the third-party application, and any combination thereof.

13. The method of claim 9, wherein determining the information describing interactions by the user with the third-party application comprises:
generating an execution identifier in response to executing the third-party application; and
associating the information describing interactions by the user with the third-party application with the execution identifier.

14. The method of claim 9, wherein executing the third-party application to present the third-party content item comprises:
prompting the user to register with the third-party system by providing data to the third-party application.

15. The method of claim 9, wherein obtaining the attribution identifier comprises:
generating the attribution identifier by applying a cryptographic hash function to data comprising at least one selected from a group consisting of: an identifier of the client device, an identifier of the user maintained by the online system, an identifier of an operating system of the client device, an identifier of the third-party content item in the online system, an indication of whether the third-party application is installed on the client device, and any combination thereof.

16. The method of claim 9, wherein obtaining the attribution identifier comprises:
transmitting data comprising at least one selected from a group consisting of: an identifier of the client device, an identifier of the user by the online system, an identifier of an operating system of the client device, an identifier of the third-party content item in the online system, and an indication of whether the third-party application is installed on the client device from the mobile device to the online system; and
receiving the attribution identifier from the online system, the attribution identifier generated by application of a cryptographic hash function, by the online system, to the transmitted data.

17. A computer program product comprising a computer readable storage medium having instructions encoded thereon that, when executed by a processor, cause the processor to:
transmit, from an online system to a client device, a third-party content item originating from a third-party system, the third-party content item for presentation in a client application associated with the online system and including a pointer to a third-party application associated with the third-party system;
obtain an attribution identifier and an interaction with the third-party content item by a user of the client device via the client application, the attribution identifier generated in response to the interaction, and the interaction causing the client device to execute the third-party application using the pointer;
receive, from the third-party system, an attribution identifier and information describing interaction by the user with the third-party application;
determine whether the attribution identifier obtained from the client device matches the attribution identifier received from the third-party system; and
associate the information describing interaction by the user with the third-party application with the interaction with the third-party content item by the user of the client device via the client application responsive to determining that the attribution identifier obtained from the client devices matches the attribution identifier received from the third-party system.

18. The computer program product of claim 17, wherein receiving, from the third-party system, the attribution identifier and the information describing interaction by the user with the third-party application comprises:
receiving information describing an interaction selected from a group consisting of: an interaction with the third-party content item via the third-party application, an interaction with additional third-party content item via the third-party application, an interaction of the user with a registration process of the third-party application, and any combination thereof.

19. The computer program product of claim 17, wherein receiving, from the third-party system, the attribution identifier and the information describing interaction by the user with the third-party application comprises:
receiving an execution identifier generated by the third-party application, the execution identifier generated in response to the interaction with the third-party content item causing the client device to execute the third-party application; and
receiving the information describing interaction by the user with the third-party application associated with the received execution identifier.

20. The computer program product of claim 17, wherein the attribution identifier received from the third-party system is generated by a cryptographic hash of data comprising at least one selected from a group consisting of: an identifier of the client device, an identifier of the user maintained by the online system, an identifier of an operating system of the client device, an identifier of the third-party content item in the online system, an indication of whether the third-party application is installed on the client device, and any combination thereof.

* * * * *